Figure 1:
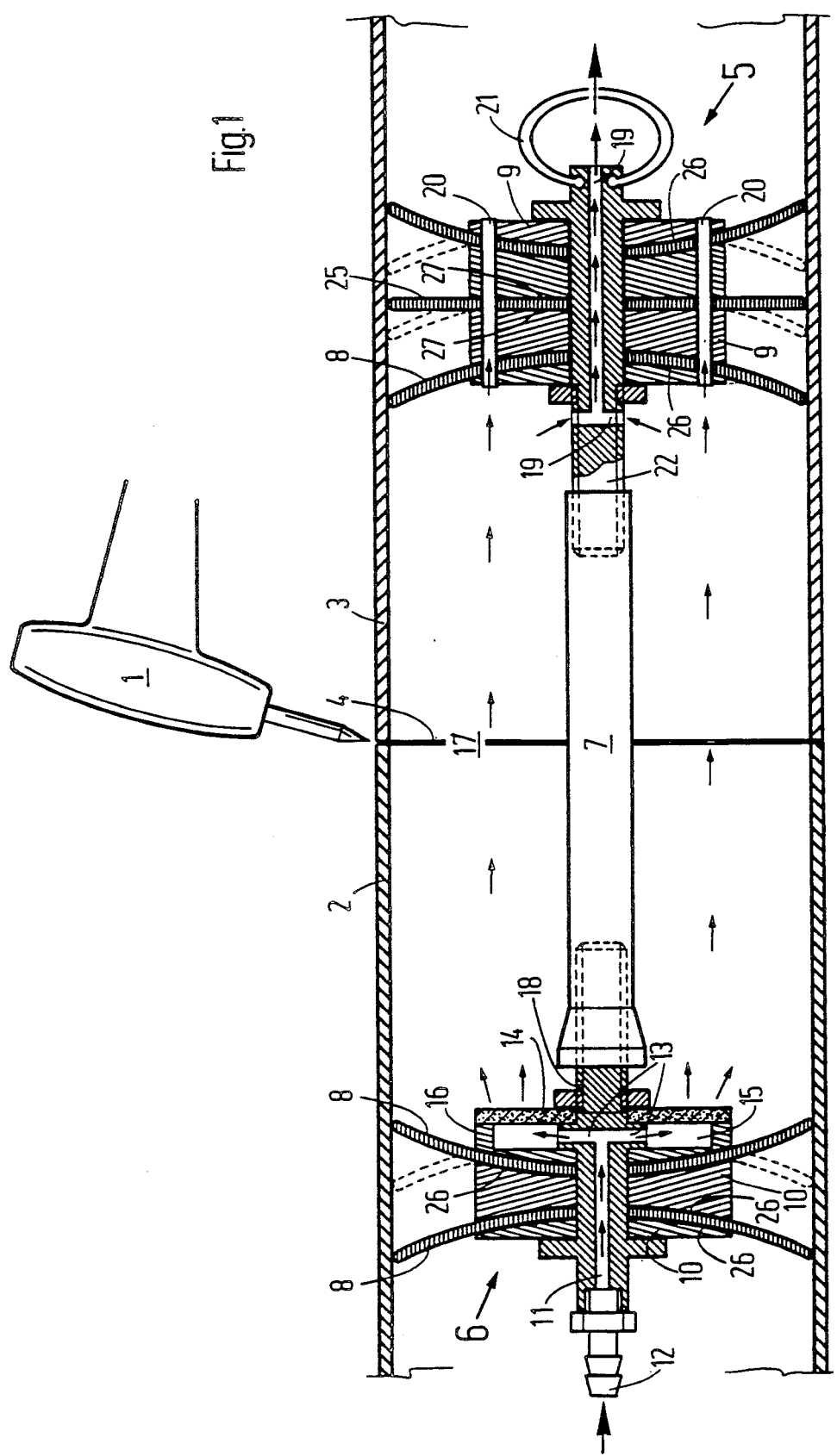

United States Patent [19]

Schnorrer

[11] Patent Number: 5,126,526
[45] Date of Patent: Jun. 30, 1992

[54] DEVICE FOR HINDGAS COVERAGE IN TUBE WELDING

[76] Inventor: Walter Schnorrer, Ryesgade 40, DK-9000 Aalborg, Denmark

[21] Appl. No.: 612,268

[22] Filed: Nov. 13, 1990

[51] Int. Cl.[5] .............................................. B23K 9/00
[52] U.S. Cl. .................................. 219/74; 219/60 R; 219/136
[58] Field of Search ................. 219/60 R, 61, 74, 136, 219/125.11, 137 R

[56] References Cited

U.S. PATENT DOCUMENTS

| | | | |
|---|---|---|---|
| 2,966,576 | 12/1960 | Nowotny | 219/125.11 |
| 2,985,746 | 5/1961 | Harmes | 219/125.11 |
| 3,194,466 | 7/1965 | Davis | 219/60 R |
| 3,387,761 | 6/1968 | Pickard | 219/60 R |
| 4,101,067 | 7/1978 | Sloan et al. | 219/136 |
| 4,302,652 | 11/1981 | Nobileau et al. | 219/61 |
| 4,828,160 | 5/1989 | Sundholm | 219/74 |

FOREIGN PATENT DOCUMENTS

| | | | |
|---|---|---|---|
| 200407 | 5/1983 | German Democratic Rep. | 219/74 |
| 2201623 | 9/1988 | United Kingdom | 219/137 R |

*Primary Examiner*—Clifford C. Shaw
*Attorney, Agent, or Firm*—Lee, Mann, Smith, McWilliams, Sweeney & Ohlson

[57] ABSTRACT

A device for hindgas coverage in welding tube pieces (2,3) together comprises two sealing devices (5,6) connected by a rod (7). The sealing devices comprise a first web part (10) with sealing means (8) and a supply duct (11) for hindgas, and a second web part (9) with sealing means (8,25) and discharge ducts (19,20) for controlled outflow of gas to the surroundings. Some of the surfaces of each web part have a two-dimensional curvature (26) for forming the sealing means (8), e.g. rubber discs.

6 Claims, 3 Drawing Sheets

5,126,526

DEVICE FOR HINDGAS COVERAGE IN TUBE WELDING

The invention relates to a device for hindgas coverage in welding mainly cylindrical workpieces, especially tube pieces, in which the back side of the welded seam is isolated from atmospheric air by placing a hindgas device into the tube and forming a substantially closed space enclosing the welded seam and in which a protective gas is conducted through the space during the welding process.

From applicant's U.S. Pat. No. 4,956,537 there is known a method for hindgas coverage in arc welding and a hindgas device for carrying out the method, designed for welding between plate parts. This method and device cannot be applied for welding together tube pieces or tubes.

An article called "Svejening af rustfast stal med gasdaekning af bagsiden" (Welding of Stainless Steel with Gas Coverage on the rare side) by Palle Aastrup and Per Arp, a publication from the Danish Welding Institute, Glostrup, Denmark, published in 1984, teaches how in principle an area in a tube or two adjacent tube ends can be closed so as to produce a gas chamber for hindgas. Two sealing discs connected by means of a rod are applied, the discs and/or rod being furnished with feed openings and withdrawal openings for protective gas. The discs are made of an elastic material, and are firmly fixed under compression by means of an annular elastic sealing means within the pipe or tube. The discs are placed on both sides of the point of weld and protective gas is flushed through the space closed in this way.

An object of the invention is to provide a device for hindgas coverage in tubes or other mainly cylindrical work pieces with more simple sealing means. Another object of the invention is to provide a hindgas device by which the root side of an annular welding seam is kept from contact with atmospheric air.

This is achieved by using annular radially directed resilient sealing means mounted on at least one web part so as to provide an enclosure of an inner space in the workpiece, the sealing means consisting of at least two pieces of plate material of uniform thickness.

By designing the device with two web parts and means for connecting the two web parts, wherein the sealing means consists of pieces with circular outer periphery that are fixed and kept apart in a mainly mutually parallel position in each web part, it is achieved that both web parts can be fitted in and also removed from the tube pieces simultaneously, once the welding is completed.

By designing the hindgas device with the sealing means protruding in radial direction from the web parts, and the protruding part of the sealing means extends 10 to 30 mm from the web part, provides suitable resilience and suitable rigidity of the sealing means at one and the same time thereby always ensuring a good sealing.

By designing the hindgas device with some of the surfaces of each web part to abut on the said pieces with two-dimensional curvature, the sealing means will rest resiliently on the inside of the tubes in order to obtain a sufficient tightness, even if the sealing device should turn slightly inside the tube.

By designing the hindgas device wherein a first web part has a supply duct means for protective gas, said supply duct means having an inlet comprising a pipe branch on one side of the first web part and an outlet on the opposite side of the first web part, the outlet being enclosed by diffusor means, and where a second web part has discharge duct means for controlled outflow of gas to the surroundings, a controlled and even flow of hindgas is obtained in the gas chamber between the two web parts. This reduces gas consumption and ensures that all atmospheric air is removed and replaced by hindgas prior to the welding.

By designing the hindgas device comprising several discharge duct means wherein each discharge duct means has an inner diameter in the range of one to five, preferably two to four, millimeters, and a length in the range of six to thirty, preferably ten to twenty, times their inner diameter, a laminar flow is obtained in all discharge ducts so that even at a low flow velocity no air can enter and flow back through these ducts.

By designing the hindgas device in which a first discharge duct means is provided centrally in the second web part and the other duct means are evenly distributed in distance from the first duct means, a laminar flow is obtained in the entire gas chamber during the welding process without causing a too great gas consumption. During the cleaning period as well as during the welding process a slight positive pressure is maintained in the gas chamber so that no air can enter, for instance through the slit between the tube pieces which still remain to be welded together.

By designing the hindgas device wherein the said second web part comprises self-aligning means for the positioning of the second web part in relation to the center axis of a surrounding work piece section, it is ensured that a sufficient degree of tightness is obtained at the second web part. The first web part will usually be self-aligning due to the supply hose for the hindgas.

By designing the hindgas device wherein the self-aligning means consist of a disc-shaped piece of inflexible material having a diameter in the range of 0.80 to 0.99 times the inner diameter of the workpiece section, the necessary self-aligning effect is obtained in the second web part in a simple and inexpensive manner.

By designing the hindgas device wherein the first web part has a mainly disc-shaped diffusor means of mainly the same diameter as the first web part, and wherein there is provided a distribution chamber for protective gas, said chamber being delimited by the first web part and the diffusor means, a diffusor for the introduction of hindgas is obtained in a simple manner so that the gas is supplied across the entire one end surface of the gas chamber.

By designing the hindgas device wherein the first web part has a central through-going part containing the supply duct means and extending through a central hole in the diffusor means, the through-going part having the outlets furnished laterally in relation to the supply duct into the distribution chamber, where a free end of the through-going part juxtaposed to the diffusor means is provided with an outward screw thread and means for attaching the connecting means, the parts are assembled in a simple and reliable manner and so that varying sizes, inflexible or resilient connecting means can be applied. The sealing device will in practice be produced as finished units which are assembled at the place of the welding by joining a first web part and a second web part by means of a connecting means suitable for the particular welding to be performed.

The embodiment of the invention mentioned above is particularly suited when welding together tubes or tube pieces having an inner diameter of between approx. 30 mm and approx. 300 mm. In connection with tubes having a diameter larger than 300 mm, a second embodiment of the invention is preferably applied as will be explained below.

By designing the hindgas device with an annular web part provided with two sets of sealing means that are spaced apart and with annular diffusor means provided at the outer side of the web part and wherein the web part is made of corrugated thin steel plate material and where the diameter of the annular web part is largest close to the sealing means, a rigid and reliable hindgas device is obtained for tubes with large diameters without the occurrence of an unnecessary large gas chamber. The annular gas chamber resulting from this embodiment of the invention can be given minimum volume, but still it is constructed in such a manner that the largest gas quantity is found immediately below the welding area so that one can after all be certain that all air is evacuated from the inside of the tube in the welding area.

By designing the hindgas device wherein the sealing means consists of pieces with annular form and circular outer periphery and a U-shaped profile with the limbs in the U protruding in radial direction from the web parts, and where the edge of the annular web part is secured between the sealing means and an annular support part, there is obtained a substantially laminar flow of hindgas in the annular gas chamber, the flow taking a radial course from the centre area where the diffusor is arranged towards the sealing means so as to avoid the occurrence of areas from which air cannot be evacuated.

By designing the hindgas device wherein a number of discharge duct means are situated in axial direction and between the sealing means and the web parts, a discharge of hindgas will be produced along the entire edge and in both sides of the annular gas chamber thereby preventing the occurrence of unfortunate turbulence in the gas flow in the gas chamber.

Figure 2:
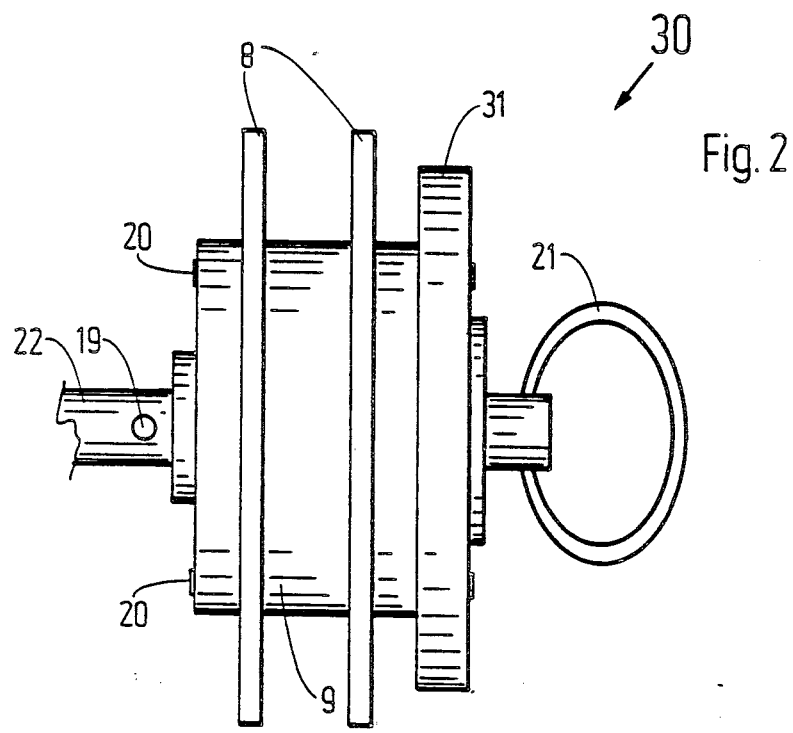
Figure 3:
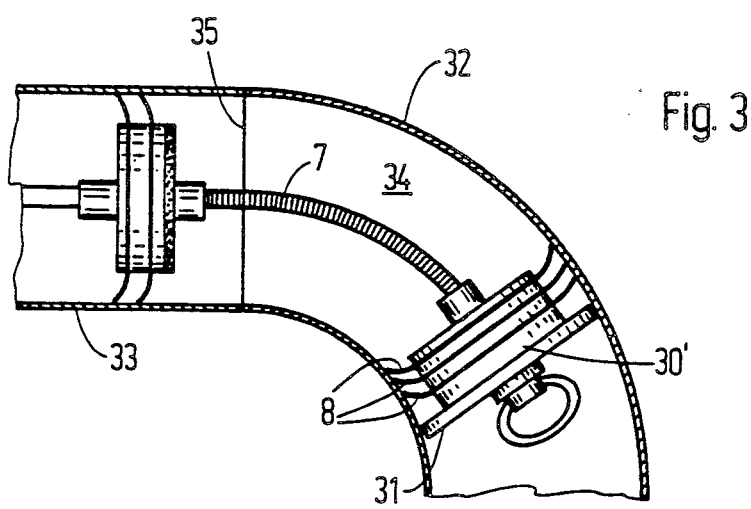
Figure 5:
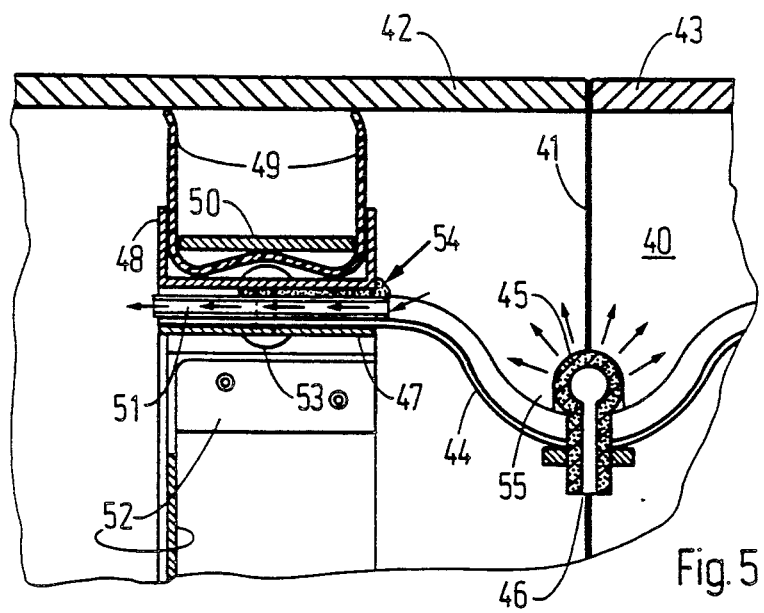
Figure 4:
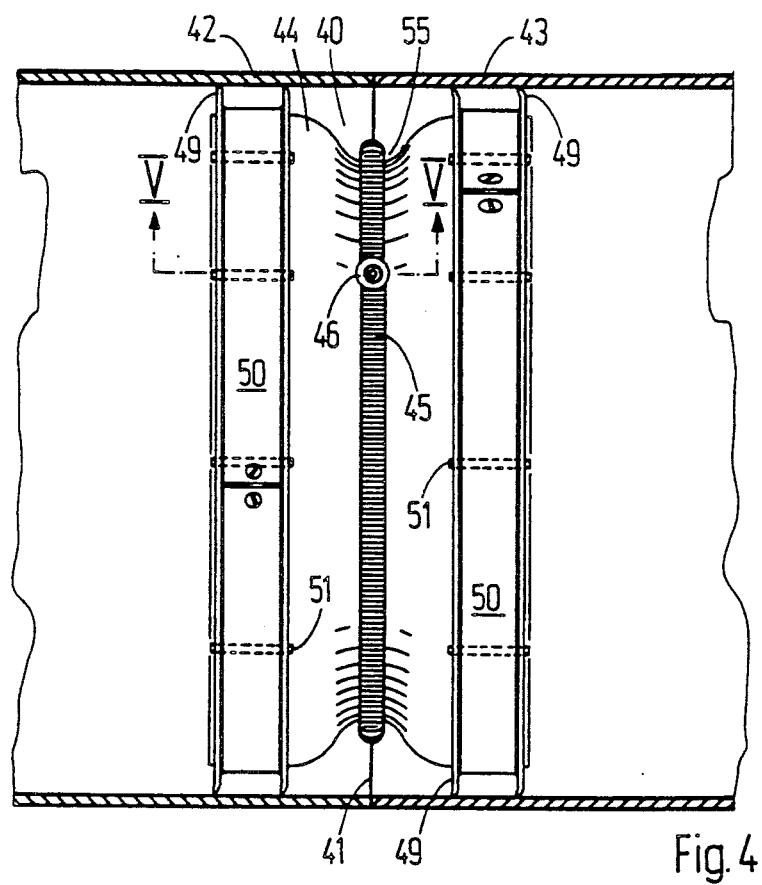

The embodiments of the invention will now be described with reference to the following drawings, which are given by way of illustration only, and thus are not limitative of the present invention, and wherein:

FIG. 1 shows an axial section of two tube ends to be welded together applying a first embodiment of a device for hindgas coverage according to the invention, FIG. 2 shows another embodiment of the second web part, FIG. 3 shows an axial section of a tube end and a tube bend being welded together applying the device for hindgas coverage according to the invention, FIG. 4 shows a partial section of a second embodiment of the invention and for tubes with a large inner diameter, and FIG. 5 shows on a larger scale a section on the line V—V in FIG. 4.

In FIG. 1 1 refers to a welding tool such as a TIG-welding handle for arc welding with protective gas, in that the tube ends 2 and 3 are to be welded together with a welding seam 4 so that the welding area is always covered by a protective gas. In order for the back of the welding seam 4 also to be permanently covered by protective gas, two sealing devices 5 and 6 connected by connecting means are provided inside the tube pieces, the connecting means consisting of an inflexible or resilient rod being screwed onto the sealing devices 5 and 6. Between the sealing devices a gas chamber 17 for hindgas is enclosed, the hindgas being for instance argon or the like which will displace air and oxygen in the chamber 17 completely avoiding oxidation of the welding area.

Each sealing device 5, 6 comprises a number of sealing members 8, 25 each consisting of 1-3 mm thick annular rubber discs having a uniform thickness and being of for instance silicone rubber or a similar resilient material which will stand heating to a temperature of 200° C. The annular discs of rubber are circular rings punched of rubber plate which permits the production of sealing means in many different sizes in a quick and inexpensive manner.

The sealing means 8, 25 has a diameter slightly larger than the inner diameter of the tube, and the number applied in each sealing device is decided according to requirements; however, at least two sealing means per sealing device are used. The more sealing means each sealing device has, the less the tendency is to capsize, and the better the obtained tightness is. Further sealing means 8, 25 are therefore also functioning as self-aligning means.

The sealing means 8, 25 is secured by means of web parts 9, 10 being for instance annular discs of metal or plastic, having plane surfaces 27 and two-dimensional curvature surfaces 27. The web parts 9, 10 hold the sealing means 8, 25 as shown, i.e. in such a manner that at least some of the sealing means 8 are held curved and so that the sealing means 25 remain plane. The sealing means 8, 25 protrude approx. 10-30 mm beyond the web part 9, 10. The web parts 9, 10 are secured to a first web part 10 and a second web part 9 by means of a supply duct 11 and a discharge duct 19.

The first web part 10 is secured to the supply duct 11 which is provided with a pipe branch 12 on to the one end of which a supply tube (not shown) for a hindgas can be fitted, and where the other end is surrounded by a gas outlet device 13 conducting the gas to an annular distribution chamber 15. The chamber 15 is delimited by an annular disc-shaped diffusor 14 of sinter metal or a similar porous material and a web part 10 having an annular boss or edge 16. Gas is hereby supplied to the gas chamber 17 without turbulence and substantially distributed across the one end wall of the chamber 17. The supply duct 11 has an outward end 18 with thread or like means of attachment for the connecting means 7 being for instance a metal tube or a tube of helical wound metal strips.

The second web part 9 is secured to the discharge duct 19 ending in a drawring 21 or a similar draw means. In the outward end 22 of the discharge duct 19 a thread or the like may be provided for attachment with the connecting means 7. In the second web part 9 there are furthermore axial discharge ducts 20, for instance four ducts spaced evenly and at a uniform distance from the central duct 19. The width in the clear of the discharge ducts 19, 20 is in the range of 1-5 mm, preferably 2-4 mm, and the length of the ducts is 6-30 times their inner diameter, preferably 10-20 times. This ensures a suitable flow resistance permitting an even flow in the gas chamber 17 and thus preventing air from entering back through the discharge ducts due to injection effects. The number of discharge ducts 19, 20 is chosen under consideration of the required gas flow.

The sealing devices 5, 6 are inserted in the tube by pulling the drawring 21 and are removed by pulling the pipe branch 12, for instance by means of the gas supply tube (not shown) when the welding seam 4 is finished.

The sealing means 8, 25 and the web parts 9, 10 are secured to the sealing devices 5, 6 by the use of suitable assembly means, such as nuts being screwed on to the supply duct 11 and the discharge duct 19, or by way of retaining means provided on these parts. In must be ensured, however, that the diffusor disc 14 is not exposed to bending strain since such sinter materials are fairly easily destroyed.

The flow of the hindgas through the hindgas device is indicated by small arrows in FIG. 1. While using the described embodiment in a tube having an inner diameter of about 76 mm, a gas flow of 10 liters per minute in 1-2 minutes is sufficient to remove atmospheric air to a sufficient degree before welding.

FIG. 2 shows a sealing device 30 being a second embodiment of the second web part but provided with self-aligning means 31 by way of an inflexible disc, such as a metal disc 31.

FIG. 3 shows how the sealing device 30' has a self-aligning effect due to the self-aligning means 31 although it is arranged in a tube bend 32 which is to be welded to a straight tube 33 by an annular welding seam 35. The welding seam 35 is positioned between the sealing devices 6 and 30'. In this embodiment the sealing device 30' has three sealing means 8 and a self-aligning disc 31, whereby the sealing device is positioned correctly and closes the tube bend.

The self-aligning means 31 has a diameter of between 0.80 and 0.99 times the inner diameter of the tubes.

The embodiments shown in FIGS. 1-3 are applicable when welding together tubes of an inner diameter of 30-300 mm.

If the diameter of the tube workpieces exceeds 300 mm, the same sealing devices may be applied, but the size of the gas chamber 17, 34 will be correspondingly larger thereby causing an unnecessary large consumption of hindgas.

In connection with annular weldings of tube pieces having an inner diameter above 300 mm, the embodiment shown in FIGS. 4-5 is therefore preferably used.

According to this embodiment an annular chamber 40 for hindgas is obtained which can be produced with a small volume but still in such a manner that the main part of the gas is found near the welding seam 41. The hindgas device comprises two sealing devices 49, one on each side of the welding seam 41 between the two tube pieces 42, 43 which are to be welded together. Each sealing device 49 is an annular rubber item made from rubber plate of uniform thickness and of heat-resistant type. Each item is pressed into a U-shape while fastening it, whereby the limbs of the U point radially outwards, Cf. FIG. 5. The outer edge of these is in sealing contact with the inner wall of the tube pieces 42, 43. The sealing device 49 is arranged in an annular fastening device 48 which is also U-shaped and face in the same direction as do the sealing devices 49, Cf. FIG. 5. In order to secure the sealing device 49 in such a manner that it can also be replaced, an annular strap 50 is used which also reinforces the tightening between the annular web member 44 and the annular fastening device 48.

The web part in this embodiment consists of an annular web member 44 of thin stainless steel plate and corrugated axially. The web member 44 resembling a pair of bellows is enclosed between the annular fastening device 48 and a likewise annular support part 47 which may be supported by radial arms 52 or the like. Holding together of the parts is effected by rivets 53.

In the assembly area between the annular support part 47 and the annular fastening device 48 there is provided a number of discharge ducts 51, for instance eighteen discharge ducts 51 distributed around the periphery. Due to the corrugated shape of the annular web member 44, the discharge ducts 51 are easily fitted here in the assembly area which is sealed by silicone rubber 54 or the like. The dimensions of the discharge ducts 51 are substantially the same as those of the discharge ducts 20 shown in FIG. 1.

For the supply of hindgas a T-shaped inlet pipe 46 is provided which is connected to an annular tubular diffusor 45 such as a perforated tube or a metal tube with spaced leaks, such as a helical metal strip tube. The diffusor 45 is arranged in an annular groove 55, Cf. FIGS. 4 and 5, so that the width of the clear of the gas chamber 40 can be held as small as possible, whereas the hindgas is still supplied into the area right below the welding seam 41 and out through the discharge ducts 51. Arrows in FIG. 5 indicate the flow direction of the hindgas.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A device for hindgas introduction and containment in a tubular work piece, comprising annular radially directed resilient sealing means mounted on at least one web part so as to provide an enclosure of an inner space in the work piece, the sealing means consisting of at least two pieces of plate material of uniform thickness, said web part comprising an annular web located between two sets of spaced apart sealing means, said annular web having an outer side forming a part of said enclosure, and including annular diffuser means located on said outer side.

2. A device according to claim 1, wherein the web part is made of corrugated thin steel plate material and where the diameter of the annular web part is largest close to the sealing means.

3. A device according to claim 2, wherein a number of discharge duct means are situated in axial direction and between the sealing means and the web part.

4. A device according to claim 3, wherein the discharge duct means has an inner diameter in the range of one to five millimeters, and a length in the range of six to thirty times their inner diameter.

5. A device according to claim 1, wherein the sealing means consists of pieces with annular form and circular outer periphery and a U-shaped profile with the limbs in the U protruding in radial direction from the web parts, and where the edge of the annular web part is secured between the sealing means and an annular support part.

6. A device according to claim 1, wherein the sealing means protrudes in radial direction from the web parts, the protruding part of the sealing means extends 10 to 30 millimeters from the web part.

* * * * *